United States Patent
Madter et al.

(10) Patent No.: US 7,386,713 B2
(45) Date of Patent: Jun. 10, 2008

(54) ON-CHIP SECURITY METHOD AND APPARATUS

(75) Inventors: Richard C. Madter, Puslinch (CA);
Ryan J. Hickey, Waterloo (CA);
Christopher Pattenden, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 398 days.

(21) Appl. No.: 10/500,131

(22) PCT Filed: Dec. 13, 2002

(86) PCT No.: PCT/CA02/01947

§ 371 (c)(1),
(2), (4) Date: Jun. 25, 2004

(87) PCT Pub. No.: WO03/060670

PCT Pub. Date: Jul. 24, 2003

(65) Prior Publication Data

US 2005/0033951 A1 Feb. 10, 2005

Related U.S. Application Data

(60) Provisional application No. 60/342,082, filed on Dec. 26, 2001.

(51) Int. Cl.
*G06F 9/06* (2006.01)
*G06F 9/24* (2006.01)
*H04L 9/08* (2006.01)
*H04L 9/14* (2006.01)
*H04L 9/28* (2006.01)
*H04L 9/30* (2006.01)

(52) U.S. Cl. .............. 713/2; 713/1; 713/100; 713/171; 713/173; 713/175

(58) Field of Classification Search ............ 713/1, 713/2, 100, 171, 173, 175
See application file for complete search history.

(56) References Cited

U.S. PATENT DOCUMENTS

| 5,444,850 A | 8/1995 | Chang |
| 5,634,079 A | 5/1997 | Buxton |
| 5,802,592 A | 9/1998 | Chess et al. |

(Continued)

FOREIGN PATENT DOCUMENTS

EP 0 816 970 A2 1/1998

(Continued)

*Primary Examiner*—James K Trujillo
(74) *Attorney, Agent, or Firm*—Dimock Stratton LLP; Jenna L. Wilson

(57) ABSTRACT

A boot method an apparatus are described which reduce the likelihood of a security breach in a mobile device, preferably in a situation where a reset has been initiated. A predetermined security value, or password, is stored, for example in BootROM. A value of a security location within FLASH memory is read and the two values are compared. Polling of the serial port is selectively performed, depending on the result of such comparison. In a presently preferred embodiment, if the value in the security location matches the predetermined security value, then polling of the serial port is not performed. This reduces potential security breaches caused in conventional arrangements where code may be downloaded from the serial port and executed, which allows anyone to access and upload programs and data in the FLASH memory, including confidential and proprietary information.

18 Claims, 4 Drawing Sheets

U.S. PATENT DOCUMENTS

| | | |
|---|---|---|
| 5,805,882 A | 9/1998 | Cooper et al. |
| 5,937,063 A * | 8/1999 | Davis .......................... 713/187 |
| 6,018,806 A | 1/2000 | Cortopassi et al. |
| 6,138,236 A * | 10/2000 | Mirov et al. ................... 726/26 |
| 6,263,431 B1 * | 7/2001 | Lovelace et al. ............... 713/2 |
| 6,775,778 B1 * | 8/2004 | Laczko et al. ............... 713/194 |
| 2005/0081071 A1 * | 4/2005 | Huang et al. ................ 713/300 |

FOREIGN PATENT DOCUMENTS

| | | |
|---|---|---|
| WO | WO 00/21238 A1 | 4/2000 |
| WO | WO 01/24012 A1 | 4/2001 |

* cited by examiner

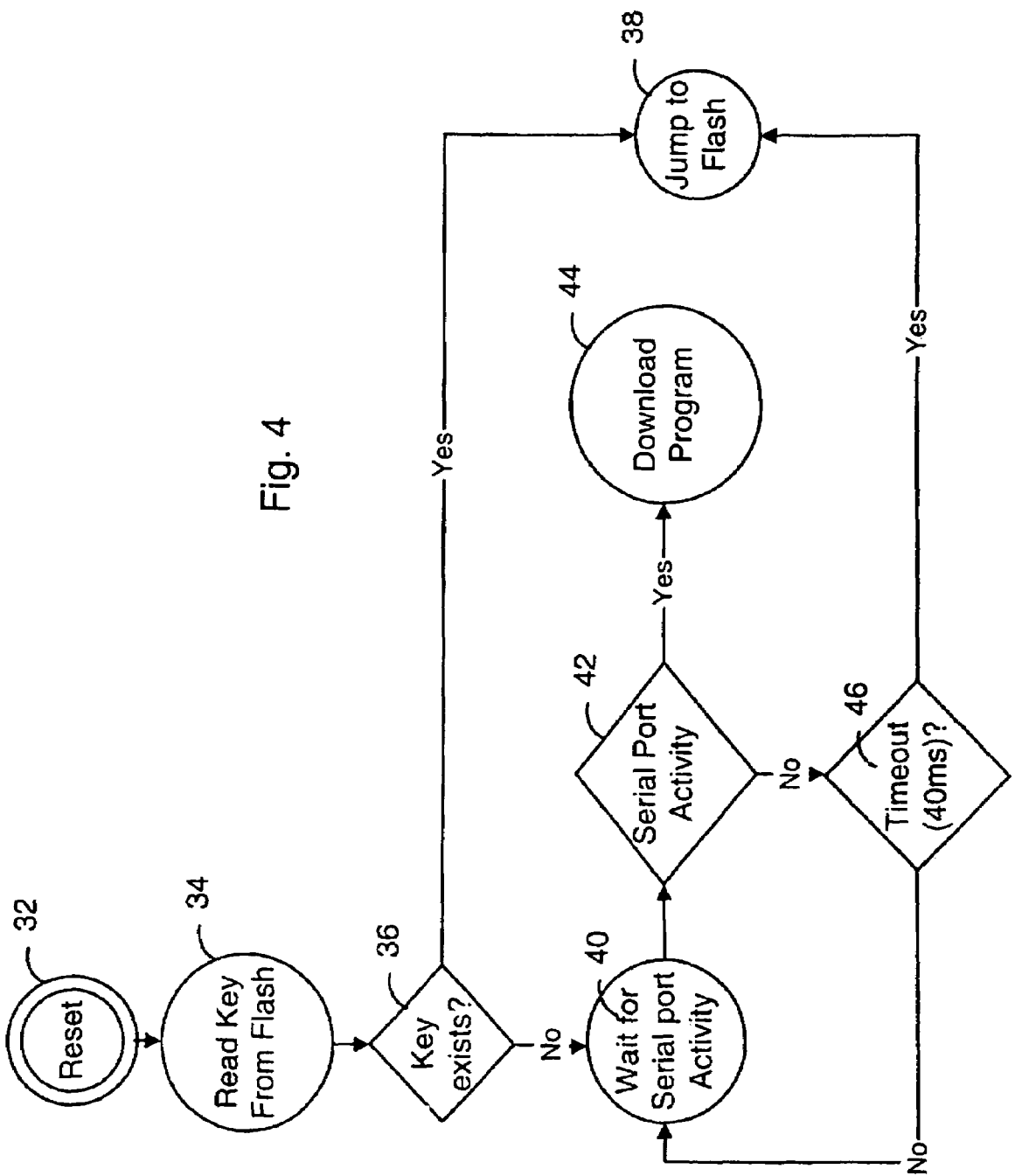

ON-CHIP SECURITY METHOD AND APPARATUS

This application claims the benefit of priority from U.S. patent application Ser. No. 60/342,082 filed on Dec. 26, 2001.

FIELD OF THE INVENTION

The present invention relates to the field of application-specific integrated circuits (ASICs) and on-chip BootROM (Boot Read-Only Memory). In particular, the present invention relates to the field of incorporating security features into on-chip BootROM, preferably for use in a mobile device.

BACKGROUND OF THE INVENTION

Many mobile devices, such as cellular telephones, personal digital assistants (PDAs), and other handheld computing and communicating devices, currently perform numerous and complex functions. Such a mobile device may occasionally require resetting of at least a portion of the software used thereon to a known prior state in order to avoid current or potential problems. Typically, a mobile device comprises a reset switch, or other equivalent means known in the art, which a user can actuate in order to initiate a reset process.

It has been observed that some existing ASIC processors for mobile devices may be breached through their serial port line after a reset process has been initiated. An external reset switch typically controls a reset circuit in the mobile device. When the reset switch is actuated, the reset circuit closes, sending a signal, or reset command, to the ASIC to reset. When the reset switch is released and the reset circuit opens, instructions stored in internal BootROM are executed and the BootROM instructs the ASIC to poll a serial port, which can be connected to a personal computer, for activity.

If there is serial port activity, this usually indicates that there is new code to be downloaded. This new code may be stored in memory on a personal computer, or may be transmitted via the personal computer from another source and may comprise, for example, a new version of code to be executed in the mobile device. Typically, program code in the BootROM will jump to a routine for downloading the new code via the serial port into internal SRAM. Once downloading is complete, the program code in BootROM will jump to the beginning of the downloaded new code and begin to execute the downloaded new code. This downloaded new code typically has complete access to other components in the mobile device, such as FLASH memory, in terms of instructions and commands that are permitted. This constitutes a potential security risk, since it can allow anyone to provide new code at the serial port that, once executed, can access and upload programs and data stored in the mobile device's FLASH memory, including confidential and proprietary information. Such access would constitute a security breach.

It is therefore desirable to provide a security feature in order to reduce the likelihood of occurrence of such a breach.

SUMMARY OF THE INVENTION

It is an object of the present invention to obviate or mitigate at least one disadvantage of previous memory and processor arrangements, particularly those provided for use with handheld or mobile devices.

A boot method used by an ASIC and memory in a mobile device is described, as well as an apparatus for use in such mobile device. A security feature is provided according to an embodiment of the invention that reduces the likelihood of a security breach, preferably in a situation where a reset of the mobile device has been initiated. The security feature comprises selective polling of the serial port based on the result of a comparison between a value stored on an ASIC, such as in BootROM, and a value stored in FLASH memory.

A predetermined security value, or password, is stored in a circuit in the mobile device, for example in BootROM. Program code in the BootROM is preferably modified so that a security location within the mobile device's. FLASH memory is read prior to polling the serial port for activity. If the value in the security location matches the predetermined security value, then polling of the serial port is not performed. This reduces potential security breaches caused in conventional arrangements where code may be downloaded from the serial port and executed, which allows anyone to access and upload programs and data in the FLASH memory, including confidential and proprietary information.

In one aspect of the invention, a predefined memory location, e.g. a security location, in the FLASH memory contains a password, or similar security value. Immediately after a device reset, boot code programmed into the ASIC reads from the security location in the FLASH memory before polling the serial port for activity. If the value read matches the expected password, the boot code jumps directly to the start of FLASH memory and prohibits downloading of a program into system memory via the serial port.

According to an aspect of the invention, there is provided a boot method for use in a mobile device having FLASH memory storing boot instructions and having a serial port, comprising the steps of: reading contents of a security location in the FLASH memory; comparing the contents of the security location to a predetermined security value; and selectively polling the serial port for activity based on the result of the comparison.

In a presently preferred embodiment, the polling is performed if the contents of the security location do not match the predetermined security value. The method can further include the step of jumping to a boot location in FLASH memory to execute instructions stored therein. In such a case, the method can further include the step of downloading code into internal SRAM located in the mobile device in response to a detection of serial port activity, as well as the steps of executing an instruction in the downloaded code, and jumping to a boot location in FLASH memory to execute boot instructions stored therein.

In a boot method according to an embodiment of the invention, the predetermined security value can be stored in a BootROM located in the mobile device. Also, in the boot method, the step of reading is preferably performed in response to a reset command.

According to another aspect of the invention, there is provided an apparatus for use in a mobile device having a serial port, comprising: a first memory means having a predetermined security value stored therein; a second memory means having a security location; and a processor in communication with the first and second memory means for comparing the contents of the security location to said predetermined security value, and for selectively polling the serial port for activity based on the result of the comparison.

In a presently preferred embodiment, the first memory means is a Boot Read Only Memory (BootROM), and the second memory means is a FLASH memory. The apparatus can further include a reset means in communication with the processor for initiating a reset process. Preferably, the processor compares contents of the security location and the predetermined security value in response to initiation of a reset process.

In terms of specific implementations of the apparatus, the first memory means can be located on an ASIC, as can be the processor. The processor can include a microcontrol unit connected to the serial port, and can also include a digital signal processor connected to the second memory means.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein:

FIG. 4 is a flow diagram of a boot method used by an ASIC according to an embodiment of the present invention, having a security feature.

DETAILED DESCRIPTION

Generally, the present invention provides a method and apparatus for use in a mobile device. A security feature is provided that reduces the likelihood of a security breach, preferably in a situation where a reset of the mobile device has been initiated. A predetermined security value, or password, is stored, for example in BootROM. Program code in the BootROM is preferably modified so that a security location within FLASH memory is read prior to polling the serial port for activity. Polling of the serial port is then selectively performed, depending on the result of a comparison between the stored password and the contents of the security location, or key. In a presently preferred embodiment, if the value in the security location matches the predetermined security value, then polling of the serial port is not performed.

Figure 1:
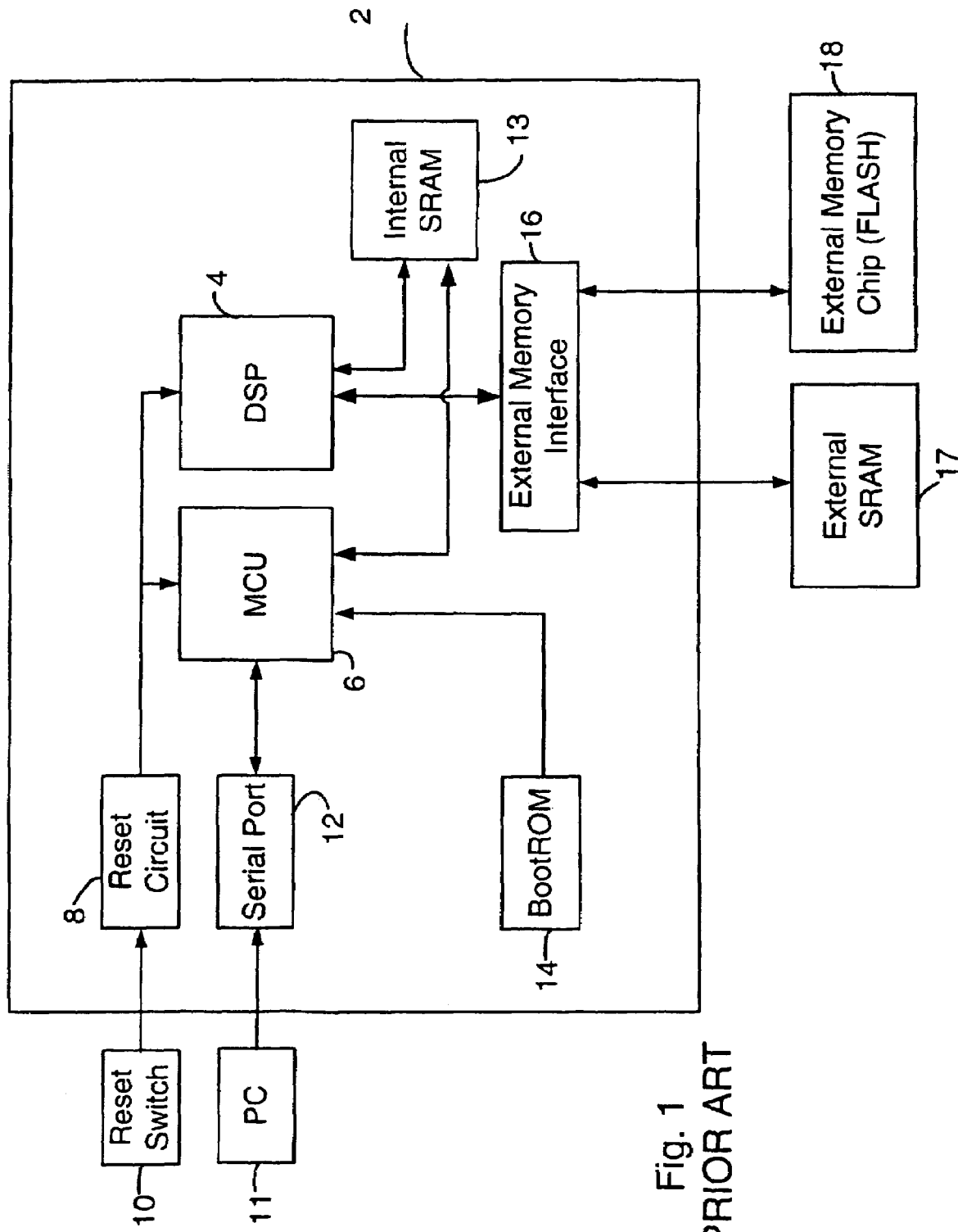
FIG. 1 is a block diagram of a typical ASIC and associated external components operating therewith.

FIG. 1 is a block diagram of a typical ASIC and associated external components operating therewith. ASIC 2 comprises a digital signal processor (DSP) 4 and a microcontrol unit (MCU) 6. It is well known in the art that the DSP 4 and the MCU 6 are essentially two processors existing in the same integrated circuit and sharing a plurality of resources.

A reset circuit 8 communicates to the MCU 6 and the DSP 4. An external reset switch 10 controls the reset circuit 8. When the reset switch 10 is actuated, the reset circuit 8 closes, sending a signal, or reset command, to the MCU 6 and the DSP 4 to reset. When the reset switch 10 is released and the reset circuit 8 opens, the MCU 6 executes instructions stored in internal BootROM 14. The reset circuit 8 and the reset switch 10 may be referred to together as comprising a reset means.

The MCU 6 also communicates with a serial port 12. The serial port 12 can be connected to a personal computer (PC) 11, enabling the PC to communicate with the ASIC 2.

Although the invention is described herein as communicating with a PC, the invention is not limited to such an arrangement; any arrangement whereby the required information can be delivered to the processor, i.e. MCU, via the serial port can be used. When the MCU 6 executes instructions stored in the internal BootROM 14 in response to a reset command, the BootROM 14 instructs the MCU 6 to poll the serial port 12 for activity.

The BootROM 14 is also located on the ASIC 2. The BootROM 14 interfaces unidirectionally with the MCU 6. The DSP 4 and MCU 6 both interface with an external memory interface 16 in order to access an external SRAM 17 and FLASH memory 18. The DSP 4 and MCU 6 also both directly access an internal SRAM 13, or other internal system memory.

Figure 2:
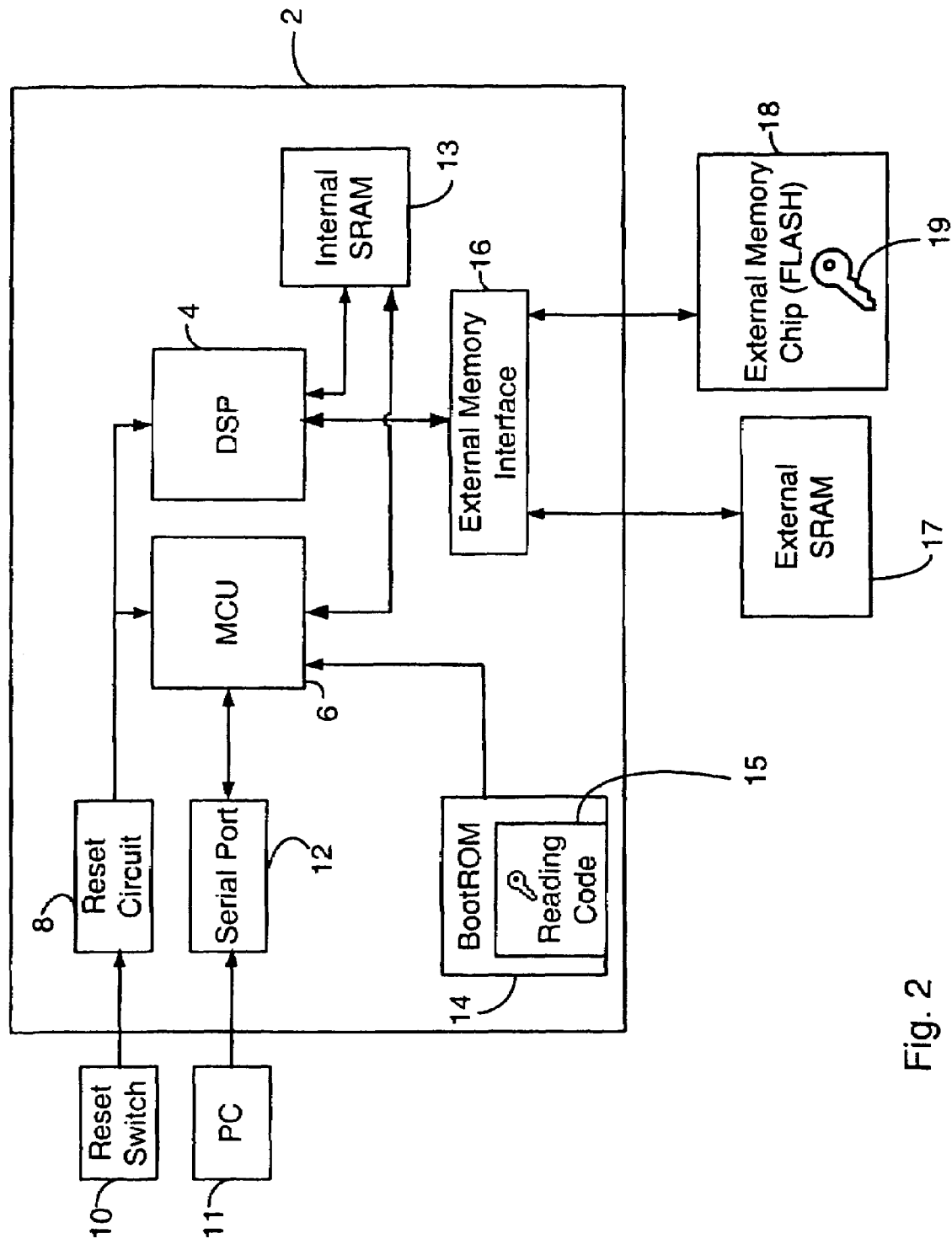
FIG. 2 is a block diagram of an ASIC and associated external components operating therewith according to an embodiment of the present invention, incorporating a security feature.

FIG. 2 shows the same ASIC and associated external components as in FIG. 1, but incorporating a security feature according to an embodiment of the present invention.

A security feature is provided according to an embodiment of the invention that reduces the likelihood of a security breach, preferably in a situation where a reset of the mobile device has been initiated. A predetermined security value, or password, is stored, for example in the BootROM 14. Program code in the BootROM is preferably modified so that a security location within the mobile device's FLASH memory is read prior to polling the serial port for activity.

Polling of the serial port is then selectively performed, depending on the result of a comparison between the predetermined security value, or stored password, and the contents of the security location. In a presently preferred embodiment, if the value in the security location matches the predetermined security value, then polling of the serial port is not performed, thereby avoiding the potential security risks associated with such polling.

In an exemplary embodiment, additional code (key reading code) 15 is preferably added to program code stored in the BootROM 14, which is executed therefrom, preferably immediately after a reset. The additional code 15 is used to preferably read a value from a security location 19, or key location, in the FLASH memory 18. The key location 19 is an example of a security location in the FLASH memory 18 in which an expected password can be stored. The term "key" can be used to represent the value stored in the security location, which will be compared to the predetermined security value stored in the BootROM. The security feature can be considered to be a selective polling of the serial port, depending on the result of a comparison of the key 19 and the expected password. Polling of the serial port is preferably not performed when the FLASH memory 18 has been programmed with the key 19 having a value that matches the predetermined security value, or password, stored in the BootROM 14, and a comparison is made to verify that match.

Figure 3:
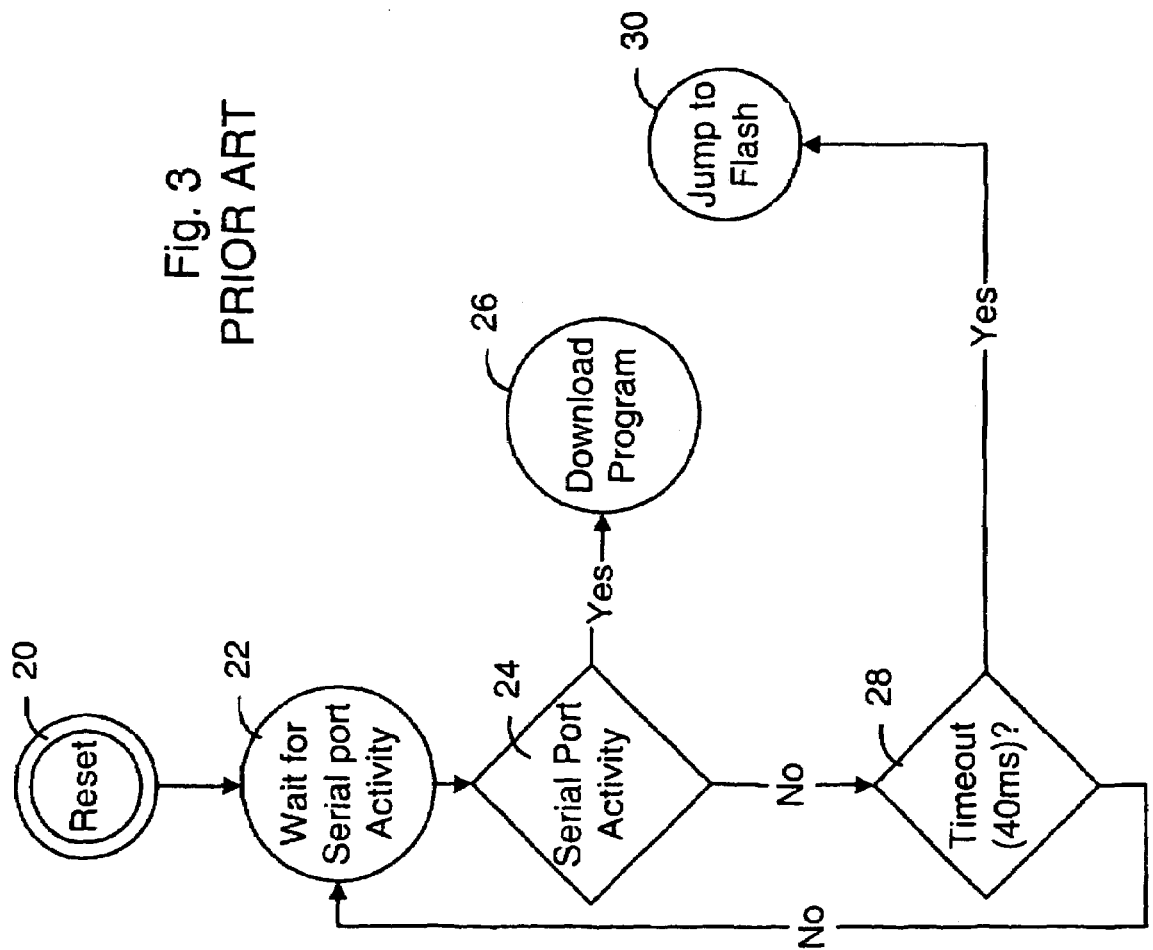
FIG. 3 is a flow diagram of a boot method used by a typical ASIC.

FIG. 3 is a flow diagram depicting a boot method used by a typical ASIC 2 when a reset is initiated. After initiation of a reset in step 20, program code stored in BootROM 14 initiates polling of the serial port 12 for activity in step 22. If the serial port is connected to a PC 11, then the PC 11 can communicate with the ASIC 2. A determination is made in step 24 as to whether there is any activity on the serial port 12. If there is serial port activity, the program code in BootROM 14 will jump to a routine for downloading code and download such program code, as illustrated-in step 26, into internal SRAM 13 via the serial port. Once downloading is complete, the program code in BootROM 14 will jump to the beginning of the downloaded code and begin to execute the downloaded code. A potential security risk in such a configuration is that a downloaded program could upload, or extract, contents of the FLASH memory 18 including confidential and/or proprietary information.

If, in step 24, it is found that there is no serial port activity, the program code in BootROM 14 waits for a timeout period to elapse, as illustrated in step 28. A current timeout value is determined, for example, by decrementing a count value in a register inside the MCU 6. When the timeout period elapses, the program code in BootROM 14 jumps directly to a boot location in the FLASH memory 18 in step 30 to execute program code starting at the boot location. If the timeout period has not elapsed, then the method returns to step 22 and waits for serial port activity or for the timeout period to elapse. A suitable timeout period can be, for example, 40 msec.

FIG. 4 shows a flow diagram depicting a boot method according to an embodiment of the present invention providing a security feature as an enhancement over the method in FIG. 3. An ASIC 2 preferably employs this method when a reset is initiated. The BootROM code 14 is preferably modified so that a predefined location, or security location, in FLASH memory 18 is read prior to polling the serial port 12 for activity.

Referring to FIG. 4, after a reset is initiated in step 32, the BootROM code 14 preferably reads the contents of the security location in FLASH memory, or the key, 19, in step 34. A determination is then made in step 36 as to whether the key, or the contents of the security location in FLASH memory, matches the password, or predetermined security value, stored in the BootROM. If it is determined that such a match exists, then in step 38, the BootROM code is preferably programmed to jump to the FLASH 18 for execution of instructions in a boot location thereof. Jumping to the boot location in FLASH memory 18 prevents the downloading of a program via the serial port 12 into internal SRAM 13.

If it is determined in step 36 that the key value does not match the stored password, then the BootROM code 14 polls the serial port 12 for activity in step 40. In step 42, it is determined whether there is any activity on the serial port 12. If in step 42, it is determined that there is activity on the serial port 12, then the method proceeds to step 44. Such a positive determination can be made, for example, when a PC is connected to the serial port. In step 44, the BootROM code 14 jumps to a routine for downloading code into the internal SRAM 13 via the serial port 12. Once this download occurs, the BootROM code 14 jumps to the beginning of the downloaded code.

If, in step 42, it is found that there is no serial port activity, the program code in BootROM 14 waits for: a timeout period to elapse, as illustrated in step 46. A current timeout value is determined, for example, by decrementing a count value in a register inside the MCU 6. When the timeout period elapses, the program code in BootROM 14 jumps directly to a boot location in the FLASH memory 18 in step 38 and the program code execution continues. If the timeout has not elapsed, then the method returns to step 40 and waits for serial port activity or for the timeout period to elapse.

Although the option of polling the serial port for activity still exists in the flowchart in FIG. 4, this path will be followed only in the absence of a security value that matches the stored password. Programming of a predetermined security value and a matching value in a security location in FLASH memory is preferably performed during development or production of the mobile device, prior to its commercial sale. It is possible that a malicious individual could try to modify the code following its commercial sale so that the key is not recognised as matching the password, in which case polling of the-serial port would occur. However, such a security breach would be difficult to attempt outside of the development phase, once the key reading code 15 has been added to the BootROM code 14. Furthermore, attempting a breach to take advantage of this potential security risk would involve invasive measures not generally known to a layperson.

Although expressions such as security location and memory location are used herein in the singular, this is simply for convenience and one skilled in the art will appreciate that any number of memory locations may be used in order to store a predetermined security value or values. The number of memory locations required can depend on the complexity of the security value and its length, which may affect the selection of the predetermined security value. In terms of physical implementation, such memory locations may be either contiguous or non-contiguous locations linked to one another in some manner known to those skilled in the art, so as to represent, together, a security location, for example.

In an alternative embodiment, selective polling of the serial port is performed in the case where the value in the security location does match the predetermined security value. Any other suitable comparison scheme or equivalent security feature may be alternatively used in order to regulate the selective polling of the serial port in a mobile device.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A boot method for use in a mobile device having FLASH memory storing a key value and content comprising boot instructions stored in a security location, an internal read-only memory storing boot program code and a predetermined security value, and a serial port, execution of the boot program code stored in the read-only memory causing the mobile device to perform the steps of:
   reading the key value from a security location in the FLASH memory, the key value being independent of the content of the FLASH memory;
   comparing the key value to a predetermined security value stored in the internal read-only memory, the predetermined security value being independent of the content of the FLASH memory; and
   depending on the result of the comparison of the key value to the predetermined security value, either polling the serial port for activity or jumping to the FLASH memory for execution of boot instructions stored therein.

2. A boot method according to claim 1 wherein the polling is performed if the key value does not match the predetermined security value.

3. A boot method according to claim 2 further comprising the step of downloading code into internal SRAM located in the mobile device in response to a detection of serial port activity.

4. A boot method according to claim 3 further comprising the step of executing an instruction in the downloaded code.

5. A boot method according to claim 1 wherein the predetermined security value is stored in a BootROM located in the mobile device.

6. A boot method according to claim 1 wherein the step of reading is performed in response to a reset command.

7. A processor configured to communicate with internal read-only and FLASH memories of an apparatus for use in a mobile device having a serial port, the processor being configured to execute boot program code stored in a read-only memory for reading a key value from a security location in the FLASH memory, and for comparing said key value to a predetermined security value stored in the internal read-only memory wherein said predetermined security value and said key value are each independent of other content stored in the FLASH memory, and, depending on the result of the comparison of the key value to the predetermined security value, either polling the serial port for activity or jumping to the FLASH memory for execution of boot instructions stored therein.

8. An apparatus for use in a mobile device having a serial port, the apparatus comprising:
a FLASH memory storing a key value in a security location and further storing content comprising boot instructions, the key value being independent of the content;
an internal read-only memory storing boot program code for reading the key value and further storing a predetermined security value stored in the internal read-only memory, the predetermined security value being independent of the content of the FLASH memory; and
a processor configured to communicate with the internal read-only memory and the FLASH memory, the processor being configured to execute the boot program code to read the key value from the security location, to compare the key value to the predetermined security value, and, depending on the result of the comparison of the key value to the predetermined security value, either polling the serial port for activity or jumping to the FLASH memory for execution of boot instructions stored therein.

9. An apparatus according to claim 8 wherein the internal read-only memory comprises a Boot Read Only Memory (BootROM).

10. An apparatus according to claim 8 further comprising a reset means in communication with the processor for initiating a reset process.

11. An apparatus according to claim 8 wherein the processor compares the key value and said predetermined security value in response to initiation of a reset process.

12. An apparatus according to claim 8 wherein the internal read-only memory is located on an ASIC.

13. An apparatus according to claim 8 wherein the processor is located on an ASIC.

14. An apparatus according to claim 8 wherein the processor comprises a microcontrol unit connected to the serial port.

15. An apparatus according to claim 8 wherein the processor comprises a digital signal processor connected to the FLASH memory means.

16. A method for bootup of a computing device, the computing device comprising a serial port and internal memory comprising FLASH memory and a BootROM memory comprising BootROM code, the method comprising the steps of:
executing instructions stored in the BootROM code to read a key value from a security location in the FLASH memory, the key value being independent of other content stored in the FLASH memory;
executing instructions stored in the BootROM code to compare the key value to a predetermined security value stored in the BootROM memory, the predetermined security value being independent of the other content stored in the FLASH memory;
on the condition that the comparison shows a match between the key value and the predetermined security value, executing instructions stored in the BootROM code to transfer execution to instructions stored in a boot location in the FLASH memory; and
on the condition that the comparison shows a mismatch between the key value and the predetermined security value,
polling the serial port for activity,
downloading new code into internal memory through the serial port in response to a detection of serial port activity, and
transferring execution to instructions in the new code.

17. A program product for a computing device, the program product comprising program code embodied in a program product media, the program product comprising program code operative to carry out the steps of claim 16.

18. An apparatus for use in a mobile device having a serial port and an internal memory comprising FLASH memory and a BootROM memory comprising BootROM code, the apparatus further comprising a processor, the BootROM code comprising instructions executable on the processor to:
read a key value from a security location in the FLASH memory, the key value being independent of other content stored in the FLASH memory;
compare the key value to a predetermined security value stored in the BootROM memory, the predetermined security value being independent of the other content stored in the FLASH memory;
on the condition that the comparison indicates a match between the key value and the predetermined security value, transfer processor execution to instructions stored in a boot location in the FLASH memory; and
on the condition that the comparison shows a mismatch between the key value and the predetermined security value,
poll the serial port for activity,
download new code into internal memory through the serial port in response to a detection of serial port activity, and
transfer processor execution to instructions in the new code.

* * * * *